Oct. 26, 1965        H. GOLDBERG        3,214,756
CONTINUOUS WAVE FREQUENCY MODULATION
DISTANCE MEASURING APPARATUS
Filed Aug. 2, 1960        6 Sheets-Sheet 1

INVENTOR.
HAROLD GOLDBERG
BY
Darby & Darby
ATTORNEYS

United States Patent Office 3,214,756
Patented Oct. 26, 1965

3,214,756
CONTINUOUS WAVE FREQUENCY MODULATION DISTANCE MEASURING APPARATUS
Harold Goldberg, Washington, D.C., assignor, by mesne assignments, to Litton Systems, Inc., a corporation of Maryland
Filed Aug. 2, 1960, Ser. No. 46,969
5 Claims. (Cl. 343—14)

This is a continuation-in-part of prior co-pending application Serial No. 704,153 filed December 20, 1957, now Patent No. 3,113,481 for "Continuous Wave Frequency Modulation Distance Measuring Apparatus." It constitutes an improvement and extension of the invention described in the prior co-pending application of Harold Goldberg, Serial No. 614,491, filed October 8, 1956, now abandoned, for "Self-Correlated Frequency-Modulated Continuous-Wave Distance-Measuring Systems."

In this prior application No. 614,491 an improved form of FM/CW distance measuring apparatus is described operating on a new principle by which the effects of feed-through from transmitting antenna to receiving antenna and the effects of "step error" are avoided. In essence this system radiates a continuous wave signal frequency-modulated at a predetermined modulating frequency. The reflected return wave is mixed with a local signal in the form of an attenuated version of the original transmitted wave, one of the transmitted, reflected or local waves being frequency-translated or shifted, preferably by means of a special continuous or stepwise linear phase-shifting device. As a result of this operation the output of the mixer constitutes a signal which is a frequency-modulated wave from which altitude or distance information can be derived, preferably in the form of an output signal of the original modulating frequency. This output signal can be used to indicate distance directly or in a preferred form is used to vary the frequency deviation of the frequency modulation process at the transmitter to maintain a particular parameter of the output signal in a fixed condition. The amount of variation of this frequency deviation is then an indication of distance.

The present application discloses a system utilizing the same principles as are disclosed in the prior application No. 614,491 and derives the advantages disclosed therein. According to one feature of the invention, the mixer output has its carrier component suppressed which results in the advantages of reduction of feed-through effects. According to another feature, one spectral component of the mixer output is selected, and that component is then automatically maintained in a fixed condition with respect to a particular characteristic, which, for example, may be having that component maintained at zero amplitude as disclosed in application No. 614,491 or maintained at a peak amplitude as in the present application.

By other features of the present invention, means are provided for assuring that, in the absence of mixer output, as when the system is not in operation or has failed, the distance reading will be at maximum, or will be disabled and means are provided for assuring that the correct peak of the characteristic is the one which is maintained.

In part the advantages of the present invention are obtained by recognizing that the mixer output of the present system has the waveform of a frequency-modulated wave whose frequency deviation and modulation index contain distance or range information; according to specific features of this invention, the frequency deviation or modulation index are utilized to provide this range information, and more specifically the range information is derived by maintaining the modulation index of the mixer output at a constant value corresponding to a zero or maximum amplitude of a selected component of the mixer output. This selected component may desirably be the first or second sideband spectral component.

According to a further and important feature of the invention, the modulating signal which is used to produce the frequency modulation of the transmitted wave is itself varied in amplitude, as by amplitude modulation, and this amplitude modulation is utilized to obtain further advantages of the present invention. The present invention is also concerned with particular ways of maintaining automatic "lock-in" and of determining the rate of change of range or distance.

The specific objects and advantages of the present invention will become apparent from the following description of a preferred form thereof, taken in conjunction with the appended drawings, in which—

Figures 1, 2:
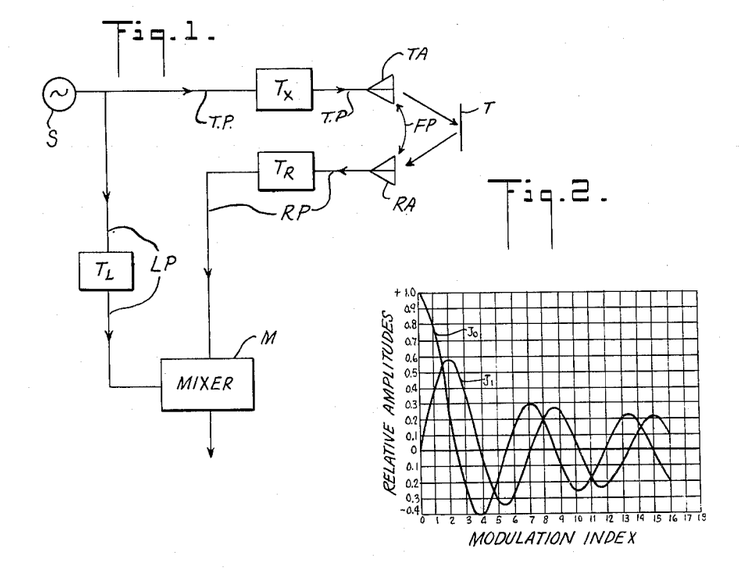
FIG. 1 is a schematic block diagram useful in explaining certain of the principles of the present invention.
FIG. 2 is a graph of the amplitudes of the carrier and the first order side band components as a function of modulation index, similarly useful.

The present invention will be first described in general principle with respect to FIG. 1, illustrating in schematic form the radio-frequency portion of the system.

A signal source S supplies its signal through a transmission path TP having a time delay $T_x$ to a transmitting antenna TA by which the signal is radiated over a path of length (range) R to a distant target or body T which reflects the signal to a receiving antenna RA over a like distance R. The reflecting body (which may be the ground or other terrain) introduces a phase shift $\phi_T$ which may be a function of time. The received signal derived from receiving antenna RA is fed through a reception path RP having a time delay $T_R$ to a mixer M to which is also supplied a signal derived from source S over a local path LP having a time delay $T_L$.

The source S radiates a signal generally expressed by:

$$S_0(t) = \cos [\phi_0(t)] \qquad (1.1)$$

where $\phi_0(t)$ is a phase function of time $t$ and time is referenced to the source S. In view of the time delay $T_x$ associated with the transmission path, at the transmitting antenna terminals the energy may be described as $$S_X(t) = A_X \cos [\phi_0(t - T_X)] \qquad (2.1)$$

where $A_X$ is an amplitude factor. In view of the transit time to the reflecting body at a distance R, the energy incident on the target may be described as $$S_I(t) = A_I \cos \left[\phi_0\left(t - T_X - \frac{R}{c}\right)\right] \qquad (2.2)$$

where $A_I$ is an amplitude factor and $c$ is the velocity of light.

After reflection, the energy incident on the receiving antenna RA is $$S_T(t) = A_T \cos\left[\phi_0\left(t - T_X - \frac{2R}{c}\right) + \phi_T\left(t - \frac{R}{c}\right)\right] \quad (2.3)$$

where $\phi_T$ is any time-varying phase shift produced by reflection from the distant body, and $A_T$ is an amplitude factor.

The energy fed to the mixer via the reception path RP is then $$S_R(t) = A_R \cos\left[\phi_0\left(t - T_X - \frac{2R}{c} - T_R\right) + \phi_T\left(t - \frac{R}{c} - T_R\right)\right] \quad (2.4)$$

where $A_R$ is an amplitude factor.

The energy fed to the mixer via the local path is $$S_L(t) = A_L \cos[\phi_0(t - T_L)] \quad (2.5)$$

where $A_L$ is an amplitude factor.

In Equations 2.1 to 2.5, the series of coefficients $A_X$, $A_I$, $A_T$, $A_R$, and $A_L$, modifying the time-variable functions, represent the attenuation sequence that the transmitted energy goes through in passage from the source to the mixer. The mixer is preferably of the balanced diode type, and operates by detecting the envelope of the input signal. The input signal, in this case, is $$S_L(t) + S_R(t)$$

If two functions of the form $a \cos A$ and $b \cos B$ are added, it may be shown by simple trigonometric manipulation that $$a \cos A + b \cos B = \sqrt{a^2 + b^2 + 2ab \cos \Delta} \cos\left[A - \tan^{-1}\frac{b \sin \Delta}{a + b \cos \Delta}\right] \quad (3.1)$$

where $\Delta = A - B$.

The detected envelope corresponds to the amplitude of the right hand side of this equation and is given by $$\sqrt{a^2 + b^2 + 2ab \cos \Delta}$$

Wherever $a$ is much greater than $b$, the following approximation is possible:

$$\sqrt{a^2 + b^2 + 2ab \cos \Delta} = a + b \cos \Delta \quad (3.2)$$

Thus, if one lets $a = A_L$, $b = A_R$, $$\Delta = \phi_0(t - T_L) - \phi_0\left(t - T_X - T_R - \frac{2R}{c}\right) - \phi_T\left(t - T_R - \frac{R}{c}\right)$$

and notes that $A_L$ is much greater than $A_R$ in a practical system, then the output of the mixer is given by $$S_M(t) = S_L(t) + S_R(t) = A_L + A_R \cos \Delta \quad (3.3)$$

By defining a new variable, $t' = t - T_L$, time may be referenced to the mixer output. The mixer output is now given by $$S_M(t') = A_L + A_R \cos\left[\phi_0(t') - \phi_0\left(t' + T_L - T_X - T_R - \frac{2R}{c}\right) - \phi_T\left(t' + T_L - T_R - \frac{R}{c}\right)\right] \quad (3.4)$$

For simplication a new composite time delay $T$ and phase shift function $\Phi(t')$ are defined as $$T = T_X + T_R + \frac{2R}{c} - T_L \quad (3.5)$$

and $$\Phi(t') = -\phi_T\left(t' + T_L - T_R - \frac{R}{c}\right) \quad (3.6)$$

T is actually the total time delay over the transmission loop from source to mixer less the delay over the local path LP. Therefore, the mixer output may now be written as $$S_M(t') = A_L + A_R \cos[\phi_0(t') - \phi_0(t' - T) + \Phi(t')] \quad (3.7)$$

If the source signal $S_0(t)$ is considered to be a sinusoidal carrier of angular frequency $\omega_0$ which is swung over a range $\Delta\omega_0$ according to a function $\omega_1$ of time, the total phase change of the signal $S_0$ over a given time increment from an arbitrary initial time $t_0$ to time $t'$ may now be defined in terms of the time integral of the instantaneous angular velocity as $$\phi_0(t') = \int_{t_0}^{t'} [\omega_0 + \Delta\omega_0 \omega_1(t)] dt$$
$$= \omega_0(t' - t_0) + \Delta\omega_0 \int_{t_0}^{t'} \omega_1(t) dt$$
$$= \omega_0(t' - t_0) + \Delta\omega_0[W_1(t') - W_1(t_0)] \quad (4.1)$$
$$= \int \omega_1(t) dt$$

where $W_1(t)$.

Therefore, $$\phi_0(t') - \phi_0(t' - T)$$
$$= \omega_0(t' - t_0) + \Delta\omega_0[W_1(t') - W_1(t_0)]$$
$$- \omega_0(t' - t_0 - T) - \Delta\omega_0[W_1(t' - T) - W_1(t_0)]$$
$$= \omega_0 T + \Delta\omega_0[W_1(t') - W_1(t' - T)]$$

Substituting this relationship into Equation 3.7 results in $$S_M(t') = A_L + A_R \cos[\omega_0 T + \Delta\omega_0 W_1(t') - \Delta\omega_0 W_1(t' - T) + \Phi(t')] \quad (4.2)$$

If a sinusoidal modulation is employed in the system, then $$\omega_1(t') = \cos \omega_1 t' \text{ and } W_1(t') = \frac{-\sin \omega_1 t'}{\omega_1}$$

Equation 4.2 can now be written as $$S_M(t') = A_L + A_R \cos\left[\omega_0 T + \frac{\Delta\omega_0}{\omega_1} \sin \omega_1 t' - \frac{\Delta\omega_0}{\omega_1} \sin \omega_1(t' - T) + \Phi(t')\right] \quad (4.3)$$

This can be trigonometrically simplified to $$S_M(t') = A_L + A_R \cos\left[\omega_0 T + \frac{2\Delta\omega_0}{\omega_1} \sin \frac{\omega_1 T}{2} \cos \omega_1\left(t' - \frac{T}{2}\right) + \Phi(t')\right] \quad (4.4)$$

Referring to Equation 3.5 above, it is apparent that T is a function of the range R. Referring to Equation 4.4, the range R is therefore contained twice in the bracketed expression, namely, in $$\sin \frac{\omega_1 T}{2} \quad (4.5)$$

and in $$\cos \omega_1\left(t - \frac{T}{2}\right) \quad (4.6)$$

The first term 4.5 contains range R in the function defining the amplitude or magnitude of the phase of the signal $S_M$. The second term (4.6) contains range R in the function defining the phase of a periodic variation of the phase of $S_M$. Therefore distance measurement or ranging can be carried out in two ways, either by measuring the amplitude of $$\frac{2\Delta\omega_0}{\omega 1} \sin \frac{\omega_1 T}{2} \quad (4.7)$$

or by measuring the phase of phase variation (4.6). While phase measurement is independent of the frequency modulation characterttics of the transmitter tube and depends only upon $\omega_1$, measurement of phase shift gives rise to an undesirable error fixed in terms of the maximum phase shift. Accordingly the present invention utilizes the term (4.7) as a measure of distance.

Since the bracketed expression of Equation 4.4 represents the complex phase function of the cosine term of $S_M(t')$, the instantaneous frequency of $S_M(t')$ may be obtained by time-differentation of this phase function, so that $$f_{inst.} = f_0 \dot{T} + \Delta f_0 \dot{T} \cos \frac{\omega_1 T}{2} \cos \omega_1 \left( t' - \frac{T}{2} \right)$$

$$-2\Delta f_0 \left( 1 - \frac{\dot{T}}{2} \right) \sin \frac{\omega_1 T}{2} \sin \omega_1 \left( t' - \frac{T}{2} \right) + \frac{1}{2\pi} \dot{\Phi}(t') \quad (5.2)$$

where the dots over T and Φ designate time derivatives. From (3.5) above it is apparent that $$\dot{T} = \frac{2\dot{R}}{c} = \frac{2V}{c} \quad (5.3)$$

where V is the relative velocity of radar apparatus and reflecting body. Therefore $$f_0 \dot{T} = \frac{2Vf_0}{c} = \frac{2V}{\lambda} \quad (5.4)$$

which is the well known expression for the Doppler frequency $f_D$. For velocities V of practical significance, $V/c$ is much less than unity so that $$1 - \frac{\dot{T}}{2} = 1 - \frac{V}{c} \cong 1 \text{ and } \dot{T} = \frac{V}{c} \cong 0$$

Assuming also that $\dot{\Phi}(t')$ in (5.2) is zero for the moment, then $$f_{inst.} = f_D - 2\Delta f_0 \sin \frac{\omega_1 T}{2} \sin \omega_1 \left( t' - \frac{T}{2} \right)$$

which shows that $S_M(t')$ appears to have the waveform of a conventional frequency-modulated signal of carrier $f_D$, with deviation of $$2\Delta f_0 \sin \frac{\omega_1 T}{2}$$

and a sinusoidal modulation signal of frequency $\omega_1/2\pi$ and a phase $\omega_1 T/2$. However, this is true only if $f_D$ is greater than the deviation. In order to assure that this condition applies, as described in the above-mentioned application Serial No. 614,491, one of the phase shifts $\phi_X(t')$, $\phi_R(t')$ or $\phi_L(t')$ is effectively caused to have a constant rate of change with time, causing $$\frac{\dot{\Phi}(t')}{2\pi} \text{ to equal } f_s$$

Then $$f_{inst.} = f_D + f_s - 2\Delta f_0 \sin \frac{\omega_1 T}{2} \sin \omega_1 \left( t' - \frac{T}{2} \right) \quad (5.6)$$

With $f_D + f_s (= f'_s)$ greater than the deviation, the signal $S_M$ has the waveform of a conventional FM wave with a modulating signal of frequency $f_1$ and a modulation index of $$\frac{2\Delta f_0}{f_1} \sin \frac{\omega_1 T}{2} \quad (5.7)$$

Since T is a function of R, the modulation index will vary with the distance being measured.

In Equation 4.4 let $\mu = \omega_0 T + \Phi(t')$, and $$B = \frac{2\omega_0}{\omega_1} \sin \frac{\omega_1 T}{2}, \text{ and } p = \omega_1 \left( t' - \frac{T}{2} \right)$$

Then $$S_M(t') = A_L + A_R \cos (\mu + B \cos p) + A_L$$
$$+ A_R \cos \mu \cos (B \cos p) - A_R \sin \mu \sin (B \cos p) \quad (6.1)$$

A simplification of this expression is possible with the aid of the following expansions:

Cos $(B \cos p)$
$$= J_0(B) - 2[J_2(B) \cos 2p - J_4(B) \cos 4p + \ldots] $$

Sin $(B \cos p)$
$$= 2[J_1(B) \cos p - J_3(B) \cos 3p + \ldots] \quad (6.2)$$

Substituting these expansions into Equation 6.1 gives $$S_M(t') = A_L + A_R[\cos \mu \, J_0(B) - 2 \sin \mu \, J_1(B) \cos p$$
$$-2 \cos \mu \, J_2(B) \cos 2p + 2 \sin \mu \, J_3(B) \cos 3p$$
$$+2 \cos \mu \, J_4(B) \cos 4p \ldots] \quad (6.3)$$

The above expression may also be written $$\frac{S_M(t')}{A_R} = \frac{A_L}{A_R}$$

$$+ J_0(B) \cos \mu$$

$$- J_1(B) \sin (p+\mu) + J_1(B) \sin (p-\mu)$$

$$- J_2(B) \cos (2p+\mu) - J_2(B) \cos (2p-\mu)$$

$$+ J_3(B) \sin (3p+\mu) - J_3(B) \sin (2p-\mu)$$

$$+ J_4(B) \cos (4p+\mu) + J_4(B) \cos (4p-\mu)$$

$$+ \ldots$$

Figure 3A:
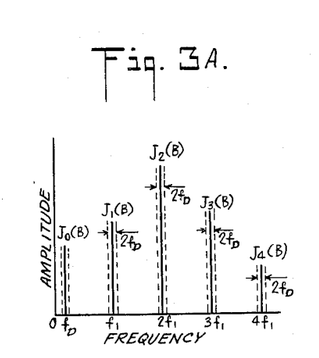
FIGS. 3A and 3B are charts showing the spectral distribution of side band components similarly useful.
Figure 3B:
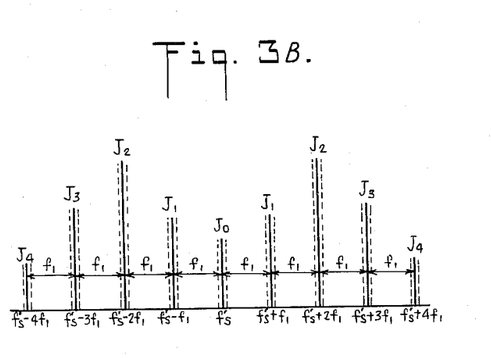

The angle $\mu = \omega_0 T + \Phi(t')$ may be associated with the Doppler frequency shift $f_D$ of the return signal resulting from phase changes with time of the return signal caused by relative motion between missile and target. When the return can be considered to originate from a single point on the target, $\mu$ may be written $$\mu = R_0 - \omega_d t' + \Phi(t') \quad (6.5)$$

where $R_0$ is a constant and $\omega_d$ is the angular Doppler frequency $2\pi f_D$. The mixer output then becomes $$\frac{S_M(T')}{A_R} = \frac{A_L}{A_R}$$

$$+ J_0(B) \cos [\omega_d t' - R_0 + \Phi(t')]$$

$$- J_1(B) \sin \left[ (\omega_1 - \omega_d)t' + R_0 - \Phi(t') - \frac{\omega_1 T}{2} \right]$$

$$+ J_1(B) \sin \left[ (\omega_1 + \omega_d)t' - R_0 + \Phi(t') - \frac{\omega_1 T}{2} \right]$$

$$- J_2(B) \cos [(2\omega_1 - \omega_d)t' + R_0 - \Phi(t') - \omega_1 T]$$

$$- J_2(B) \cos [(2\omega_1 + \omega_d)t' - R_0 + \Phi(t') - \omega_1 T]$$

$$+ J_3(B) \sin \left[ (3\omega_1 - \omega_d)t' + R_0 - \Phi(t') - \frac{3\omega_1 T}{2} \right]$$

$$- J_3(B) \sin \left[ (3\omega_1 + \omega_d)t' - R_0 + \Phi(t') - \frac{3\omega_1 T}{2} \right]$$

$$+ J_4(B) \cos [(4\omega_1 - \omega_d)t' + R_0 - \Phi(t') - 2\omega_1 T]$$

$$+ J_4(B) \cos [(4\omega_1 + \omega_d)t' - R_0 + \Phi(t') - 2\omega_1 T] + \ldots \quad (6.7)$$

where $$B = \frac{2\Delta f_0}{f_1} \sin \frac{\omega_1 T}{2} = \frac{2\Delta \omega_0}{\omega_1} \sin \frac{\omega_1 T}{2} \quad (6.8)$$

and is the modulation index. The various Bessel functions $J_0$, $J_1$, $J_2$, etc. vary differently with values of B, as shown in FIG. 2 for $J_0$ and $J_1$. The spectral distribution of energy in the mixer output signal $S_M$ as a function of frequency is shown in FIG. 3A, for a particular value of the modulation index B and, assuming that $f_D$ is much less than $f_1$, and $\Phi(t')=0$, the energy of this signal appears as spectral lines or bands centered multiples of the modulation frequency of $f_1$. However, for the desired condition that $f_D + f_s = f'_s$ is greater than $f_1$, the situation is as in FIG. 3B, with a spectrum centered at the Doppler-modified phase shift frequency $f'_s$ (which is the carrier component) and having side frequencies differing from $f'_s$ by integral multiples of the modulating frequency $f_1$. Each of the side frequencies has an amplitude given by the value of a respective Bessel function $J_1$, $J_2$, etc. For a given Doppler frequency $f_D$, and assuming that the return originates from a single spot on the target, the spectral lines in FIG. 3A are displaced an amount $f_D$ on either side of each harmonic of $f_1$. When the return signal is composed of components having different Doppler frequencies, due to differing velocities between the transmitter and reflecting body, the energy is spread over a band on either side of each harmonic of $f_1$, the band having a width equal to twice $f_D$. In FIG. 3B, for multiple returns, each spectral line becomes a band of width twice $f_D$.

The foregoing principles form the basis for the above-mentioned prior patent application Serial No. 614,491. In particular, in this prior application, a system is disclosed in which, in order to avoid the effects of direct feed through from transmitting to receiving antenna, as along path FP of FIG. 1, the lowest order component of the signal derived from the mixer (that is, the $J_0$ term) is suppressed either by filtering or use of single sideband or by automatically maintaining the modulation index B of Equation 6.8 at the value 2.40 (for which $J_0(B)$ is zero), despite variations in range R. The amount of variation of carrier frequency deviation $\Delta f_0$ required for this then serves as an indication of range R. The present system utilizes the same general principles in a specifically different manner, and departs from the particular condition of this prior application for reasons and advantages that will become apparent from consideration of the following further description.

The present system indicates range by a different way of maintaining the modulation index B at a fixed value and thereby gains a number of advantages. In particular it has been found advantageous to maintain B at a value for which some higher order Bessel function is kept at a maximum value. In one instance, B is kept at the value of 1.84 for which the Bessel function $J_1(B)$ of the first order is maximum. A particularly simple and advantageous way of accomplishing this is provided which additionally affords the advantage of maintaining a non-ambiguous indication and preventing the system from "locking in" on an incorrect range when first starting up, while maintaining the immunity against the effects of the feedthrough. In particular, as will be seen, the present system is able to measure range by using only a single spectral line, permitting use of a simple intermediate frequency circuit which is relatively narrowly tuned, and hence rejects feedthrough to an even greater extent, and is simpler to design and construct.

As seen in FIG. 2, the Bessel function $J_0$ of the zero order (to whose first zero value 2.40 the system of application No. 614,491 was synchronized) has a number of zero points of practical significance. If, when the system is first started up, the indicator should happen to have a reading adjacent one of these zeros not corresponding to the actual altitude, the system of application No. 614,491 might lock in on this incorrect zero and continuously thereafter register an incorrect altitude. The present system avoids this in the following way.

According to the present system, the frequency deviation $\Delta f_0$ of the transmitter is periodically varied at a low frequency $f_a$ which may have any value less than $\frac{1}{2}f$, and representatively may be 400 cycles per second. Thus the frequency deviation $\Delta f_0$ now becomes $\overline{\Delta f_0}(1 - m \cos \omega_a t)$ where $\overline{\Delta f_0}$ is the average deviation and $m$ is an amplitude modulation index. As a result both the modulation index B and the deviation $\Delta f_0$ are no longer constant even for a particular range but are varied about respective average values at the frequency $f_a$. As already seen, this variation of B will produce a corresponding variation in the amplitude of each of the side band spectral components of FIG. 3B, and particularly of the first order side band whose amplitude is proportional to $J_1(B)$. The result is an amplitude modulation of the first order side band which can be used for maintaining the average value of B at 1.84, for which the first order side band has maximum amplitude, by correspondingly adjusting $\Delta f_0$.

Figure 4:
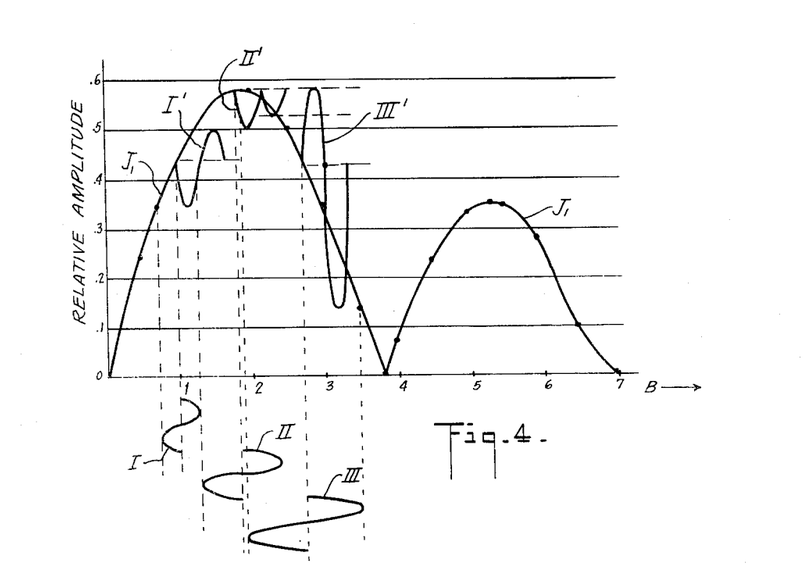
FIG. 4 is a graph showing the effect of periodic variation of modulation index in accordance with one aspect of the present invention.

The curve $J_1$ of FIG. 2 or 4 illustrates the variation with B of the absolute value of the first order Bessel function $J_1$. It will be observed from above that $$B = \frac{2\Delta f_0}{f_1} \sin \pi f_1 T$$

Substituting $2R/c$ for T, for small values of the angle this expression to a close approximation becomes $$B = \frac{4\pi \Delta f_0 R}{c}$$

where the frequency deviation $\Delta f_0$ is made to vary at the frequency $f_a$. The magnitude of this variation, which is proportional to the amplitude modulation index $m$, may be chosen to have a suitably advantageous value as discussed below.

FIG. 4 shows generally the operation for a particular value of R and different values of average transmitter frequency deviation for which the average values of B would be illustratively 1, 1.84 (for which the Bessel function $J_1$ has a maximum value) and 2.7.

In the first case, with say $m=30\%$ variation in $\Delta f_0$, B would range from .7 to 1.3 as at I in FIG. 4. This deviation causes a variation at the frequency $f_a$ in the amplitude of the first order side frequency, as shown at I' in FIG. 4.

In the second case, R has a value such that the average value of B equals 1.84. For the same percentage variation of the frequency deviation $\Delta f_0$, the modulation index B now ranges from 1.3 to 2.4 as shown at II in FIG. 4. Under these conditions, the first order side band varies its amplitude essentially at double the frequency $f_a$, as shown at II' in FIG. 4.

If an average value of 2.7 is assumed for B, with the same 30% frequency deviation variation as before, B will now vary between 1.9 and 3.5 as at III and the first order side frequency amplitude will vary as illustrated at III' in FIG. 4. It is again essentially of frequency $f_a$, but with opposite phase from that of the case I.

Hence the amplitude modulation at frequency $f_a$ of the first order side band produced by periodically sweeping $\Delta f_0$ a fixed percentage at a rate $f_a$ is indicative by its phase-sense of whether B is above or below the first maximum of $J_1$ at 1.84, this modulation being of opposite phase on opposite sides of the maximum and being minimum and substantially null at the maximum.

Accordingly, by the present invention this modulation is derived as a control signal by isolating and detecting the first order side band, and the control signal is used to drive an attenuator in a direction to adjust $\Delta f_0$ in a sense to vary B toward the value 1.84 and to maintain B at that value. For each value of range R, there will be a different unique value of $\overline{\Delta f_0}$ which will produce $B=1.84$, and there will therefore be a corresponding unique position of the attenuator. Hence an indicator calibrated in range R can be directly driven with the attenuator to indicate range.

Figure 5:
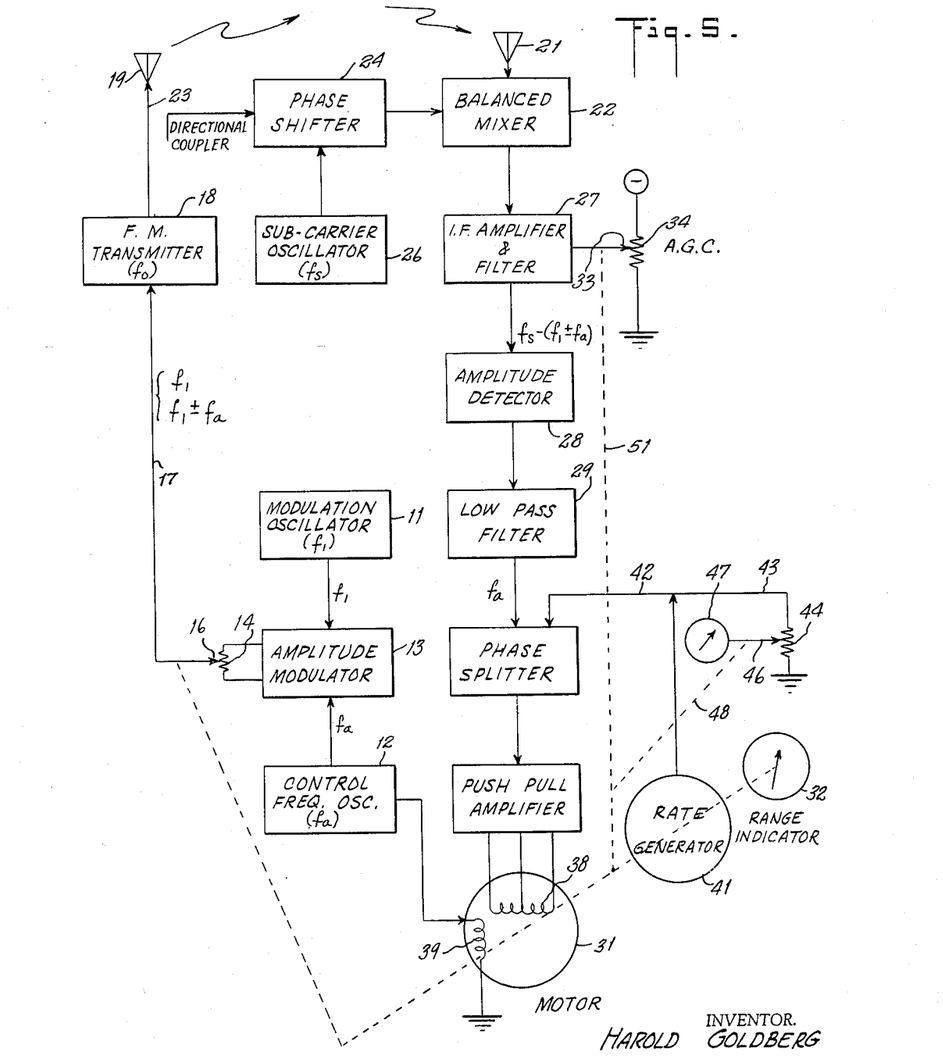
FIG. 5 is a schematic block diagram of one form of system according to the present invention.

FIG. 5 shows a general schematic diagram of one form of the present system. A modulation oscillator 11 of any suitable type is adapted to produce an output signal of constant modulation frequency $f_1$. In one illustrative system this frequency $f_1$ might be of the order of 25 kilocycles per second. A control or reference frequency oscillator 12 similarly provides an output frequency $f_a$. In one example used this frequency might be of the order of 400 cycles per second. The two outputs of oscillators 11 and 12 are supplied to an amplitude modulator 13 of any conventional type by which the signal of control frequency $f_a$ is modulated upon the output signal of modulation oscillator 11 to produce an ordinary amplitude-modulated wave of carrier or center frequency $f_1$ and modulation frequency $f_a$. The output of the amplitude modulator 13 is impressed across a suitable voltage-varying device 14, indicated schematically as a potentiometer, the position of whose adjustable tap 16 then determines the magnitude of AM signal passed by lead 17 to a frequency-modulation transmitter having a carrier of frequency $f_0$ produced in any convenient manner. In an illustrative embodiment the transmitter 18 may be formed by a reflex klystron having a carrier frequency $f_0$ of the order of 4,000 to 10,000 megacycles per second, which is frequency-modulated by the AM signal of center frequency $f_1$ appearing on lead 17 by having this AM signal supplied to the repeller electrode of the reflex klystron. It will be understood that this invention is not limited to this type of transmitter nor to this value of $f_0$, since $f_0$ could have any suitable value, desirably from the order of 100 megacycles up. The apparatus thus far described corresponds to source S of FIG. 1.

The output of transmitter 18 is then radiated by a suitable antenna system 19 (corresponding to antenna TA of FIG. 1) toward the reflecting body (such as ground, terrain, or target) whose range, clearance, distance or altitude is to be indicated. The signal reflected from that body is picked up by a suitable receiving antenna 21 (RA of FIG. 1) and supplied to a mixer 22 (or M of FIG. 1) preferably of the balanced type. At the same time a reduced level portion of the output of transmitter 18 is picked up in any suitable way, as by a directional coupler 23, and is supplied to a phase shifter 24 driven by a sub-carrier or translator oscillator 26 of frequency $f_s$. In an illustrative example, the frequency $f_s$ may be of the order of 562 kilocycles per second. The phase shifter 24 may be of the type shown in the aforesaid Goldberg application Serial No. 614,491, or that described in the copending further application Serial No. 644, 047, now abandoned, of Harold Goldberg filed March 5, 1957, and entitled "Transponder Systems," and produces a continuous step-wise phase shift having the effect of a linearly varying phase shift. As described in these two Goldberg applications, the phase shifter 24 in combination with the sub-carrier oscillator 26 serves to shift the frequency of the input to the phase shifter by the value of the sub-carrier frequency $f_s$. Any desired frequency-shifter or translator could be used. By way of example this frequency translation can be accomplished as follows. The phase shifter 24 may be replaced by two balanced modulators to each of which the frequency-modulated wave of carrier frequency $f_0$ is applied with a relative phase difference of 90 degrees. Signals of frequency $f_s$ are applied to these modulators also with a 90 degree phase difference. When the two modulator outputs are added or subtracted, one of the side bands is cancelled out. The carrier component is also cancelled out in each modulator, so that the net output contains a single side band and no carrier, which represents essentially a translation of the carrier frequency $f_0$ by the amount $f_s$. Certain higher order side bands may be present, which may be generally ignored because of their reduced amplitudes, or may be filtered out. The directional coupler 23, phase shifter 24, and associated structure here form the local path LP of FIG. 1. The shifter or frequency translator 24 could also be inserted alternatively in the received signal path RP or the transmitted signal path TP.

In this way, as demonstrated above, the output of the mixer M has the waveform of a frequency-modulated signal of carrier frequency $f_s + f_D$ (where $f_D$ is the Doppler frequency due to movement of the reflecting body) having a modulating signal which is of the frequency $f_1$ amplitude modulated by $f_a$ (i.e., of the form $$(1 + m \cos 2\pi f_a t) \cos 2\pi f_1 t$$

$m$ being the percentage modulation of the modulating frequency $f_a$ upon the carrier frequency $f_1$), and having a frequency modulation index B which is given by (6.8) above. However, because of the amplitude modulation of the signal of center frequency $f_1$ at frequency $f_a$, this modulation index B will vary periodically at the frequency $f_a$ for each value of range.

Figure 6A:
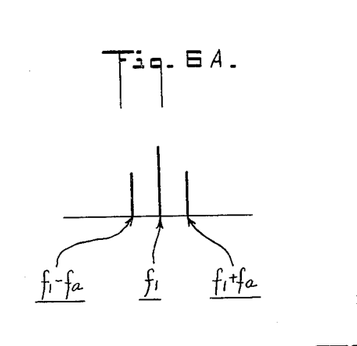
FIGS. 6A to 6D are charts of spectral distribution of signals at various points of the sytem.
Figure 6B:
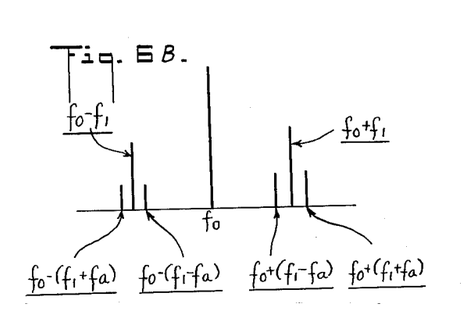
Figure 6C:
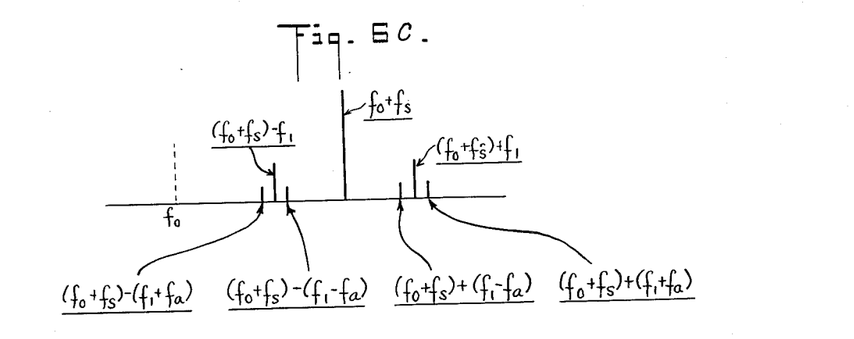

FIGS. 6A, 6B, 6C and 6D illustrate the various frequency components involved. The output of the amplitude modulator 13 is a conventional AM wave whose spectrum is shown in FIG. 6A, having a carrier component of frequency $f_1$ and upper and lower side bands of frequency $f_1 + f_a$ and $f_1 - f_a$. The radiated wave has a carrier frequency $f_0$ which is frequency-modulated by the output of the amplitude modulator 13. Accordingly, in usual fashion a plurality of side bands would be expected to occur above and below the carrier frequency $f_0$, each set of side bands being spaced from the carrier frequency $f_0$ by the modulating frequency $f_1$ or a multiple thereof. FIG. 6B illustrates the first order side bands above and below the carrier. It will be understood that this diagram is not intended to represent relative amplitudes of these side bands. As indicated, each side band is formed by a sub-carrier of frequency $f_0 \pm f_1$ spaced from the main carrier frequency $f_0$ by the modulating frequency $f_1$ and the sub-carrier in turn has upper and lower side bands spaced on either side of it by the value of the control frequency $f_a$. As shown in FIG. 6C, the output of phase shifter or frequency translator 24 is essentially the same as that of FIG. 6B except that what was the carrier frequency $f_0$ of FIG. 6B now has the value $f_0 + f_s$.

Figure 6D:
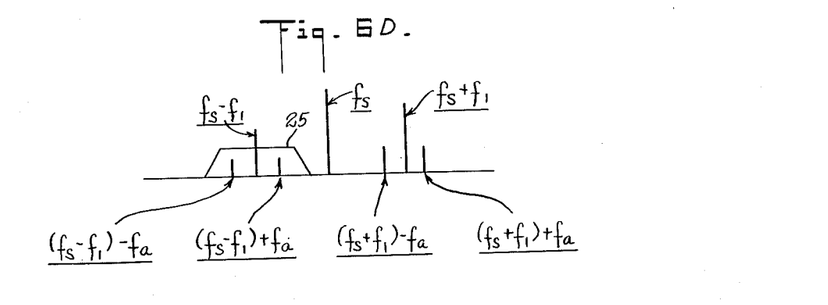

Ignoring higher than first order side bands and the Doppler effect, the output of the balanced mixer 22 will then comprise the sub-carrier frequency $f_s$ with an upper side band spaced by an amount $f_1$ therefrom and amplitude-modulated at $f_a$, plus a lower side band also spaced from the sub-carrier $f_s$ by an amount $f_1$ and similarly amplitude modulated at the frequency $f_a$. Higher order side bands also exist, but are of no concern here. This is illustrated in FIG. 6D.

The output of the balanced mixer 22 is then passed to a conventional intermediate-frequency or difference-frequency amplifier 27 which has a frequency acceptance band which passes only one first-order side band of the mixer output (illustratively indicated in FIG. 6D at 25 as the lower side band, that is, $f_s - f_1$, amplitude-modulated by $f_a$) and rejects all other components including the sub-carrier $f_s$ and the other (higher) first-order side band thereof and all higher-order side bands. The output of the IF amplifier 27 is therefore a simple amplitude-modulated wave with carrier frequency equal to $f_s - f_1$ and modulation frequency $f_a$.

In the presence of Doppler shift, the carrier frequency changes slightly and becomes $(f_s - f_1 + f_D)$, similarly amplitude-modulated. This is passed to a conventional amplitude-modulation detector 28 whose output will have components of the frequency $f_a$ and multiples thereof. This output is supplied to a low-pass filter 29 (which may be part of detector 28) which is tuned to the frequency $f_a$ so that it suppresses all harmonics of $f_a$ and passes only the component of frequency $f_a$. The low-pass filter 29 may be of any suitable type, such as an amplifier stage having a negative-feedback loop tuned sharply to reject $f_a$ as by means of a split-T network. This signal of frequency $f_a$, which may be termed an error or control signal, is used to drive a motor 31 to a position corresponding to the null value of $f_a$ by any suitable means. By way of example, the control signal $f_a$ is supplied to a phase-splitter 36 to produce a balanced signal which is amplified in a push-pull amplifier 37 and then is supplied to one winding 38 of a two-phase motor 31 having a second winding 39 which is provided with a reference signal of frequency $f_a$ from the control frequency oscillator 12 in quadrature with the phase of the output from amplifier 37. Motor 31 is coupled to arm 16 of modulation control 14 in any suitable manner.

The control signal of frequency $f_a$ is essentially the amplitude modulation caused by the periodic variation of the frequency deviation of the transmitter 18 produced by the control frequency oscillator 12 by way of the amplitude modulator 13. As indicated with respect to FIG. 4, the control signal of frequency $f_a$ derived from the filter 29 will have a predetermined phase-sense when the average modulation index of the mixer output is below the peak value 1.84 and an opposite phase-sense when that average value is above 1.84. Motor 31 is connected so that a given phase-sense of control signal $f_a$ will rotate motor 31 in a direction to vary modulation control 14 in a sense to adjust the average frequency deviation $\overline{\Delta f_0}$ of transmitter 18 in the proper direction to vary B so as to drive the $J_1(B)$ spectral component toward its peak value; that is, to vary the average value $\overline{B}$ of modulation index B toward the value 1.84. When $\overline{B}$ is about 1.84, the control signal from detector 28 becomes a multiple of $f_a$, which is suppressed by filter 29 so that the motor amplifier 37 then has a null signal and the motor will stop. The motor would run in opposite direction toward the null for opposite phase-sense of $f_a$, and thereby follows the null.

Therefore for each range value the motor 31 automatically readjusts $\overline{\Delta f_0}$ so that $\overline{B}$ remains at 1.84.

Coupled to the motor 31 is a rate generator 41 which in well known fashion produces a signal of the frequency $f_a$ and an amplitude proportional to the rate of change of motor position. This rate signal is fed back to the input of phase splitter 36 by a lead 42 for rate-damping of motor 31.

The range indicator 32 is also coupled to and driven directly by motor 31. Since each position of motor 31 represents a unique value of $\overline{\Delta f_0}$ for $\overline{B}$ constant at 1.84, each motor position also represents a unique value of range, and indicator 32 may be suitably calibrated to read range directly. It is desirable that the indicator 32 have an expanded scale at the low range end, where small variations become more significant, and a logarithmic scale is provided in the present system by suitably contouring control potentiometer 14 in an exponential manner.

The present invention provides a simple arrangement for obtaining the rate of change of range. For this purpose the rate generator output is also supplied by way of lead 43 to range-rate-compensating potentiometer 44. The arm 46 of potentiometer 44 is driven by motor 31, as indicated by the dash-line coupling 48. It will be understood that the output of the rate generator, while proportional to the speed of the motor 31, is not proportional to the rate of change of range because of the logarithmic scale factor just indicated. By also supplying the rate generator output by lead 43 to linear potentiometer 44 whose arm 46 is driven by motor 31, the signal picked up by the arm 46 becomes proportional to the actual rate of change of range and this may be suitably indicated on a range rate signal indicator 47 or supplied to an autopilot or remote computer or indicator for use in obvious fashion.

According to one feature of the present invention, the possibility of false lock-in on the wrong peak of the $J_1(B)$ curve is minimized by the use of a sufficiently high percentage modulation $m$ for the amplitude modulator. In this way, for values of $\overline{B}$ adjacent higher peaks of $J_1$, the amount of swing of $\Delta f_0$ and hence of B due to the $f_a$ modulation of the transmitter modulating signal will be sufficient to cause B to vary over a number of zeros and/or peaks, which creates multiples of $f_a$ in the output of detector 28 and reduces the fundamental to a value often insufficient to actuate motor 31. In addition, it has been discovered that any fundamental component which exists then has the same phase-sense for all values of $\overline{B}$ above 1.84, so that the control signal will drive the motor past all other maxima of $J_1$ until it locks in on $\overline{B}=1.84$. The amount of percentage modulation required for this may vary according to the parameters and characteristics of the various components, but values of from 30% to 70% may be used.

Figure 7:
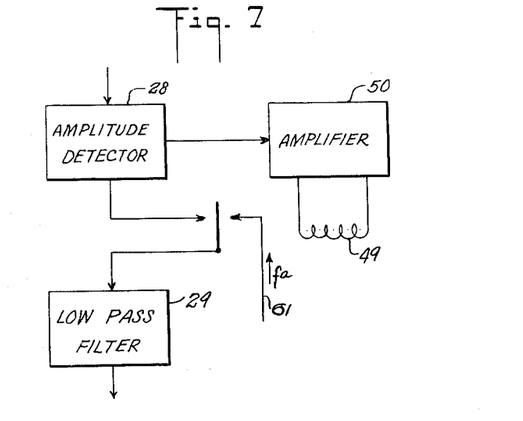
FIG. 7 is a fragmentary schematic block diagram of a modification of the system of FIG. 5.

In addition to, or in place of this latter feature, an arrangement such as that of FIG. 7 may be used to assure that the motor 31 keeps the indicator at maximum range value whenever there is no control signal. This assures that the system will always approach $\overline{B}=1.84$ from the low side, and avoids any harmful effects due to higher maxima or zeros. It will be understood that the remainder of the system of FIG. 5 will be employed with the circuit of FIG. 7, as indicated.

In FIG. 7 the D.C. output of the amplitude detector 28 is suitably amplified as at 50, and serves to actuate a relay 49 having single-pole, double-throw contacts. As is well known, so long as the IF amplifier 27 is supplied with an input signal to be detected by detector 28, there will be a D.C. detector output, which is utilized to maintain relay 49 deenergized, in which condition its left contact will connect the amplitude detector 28 to the low-pass filter 29 in the same manner as indicated in FIG. 5. However, should the signal fail for any reason, relay 49 becomes energized to transfer the input for the low-pass filter 29 to the control frequency oscillator 12, which supplies a voltage of the frequency $f_a$ and of a constant value which will drive the motor 31 to its extreme upper range indicating limit. By way of example this may be 3000 feet. At the same time a signal light or other indication may be actuated in any obvious manner to give warning that the maximum range reading is due only to signal failure. It will be understood that any suitable means of indicating this condition may be utilized, such as visible or aural signals or masking the pointer of the range indicator 32 at its maximum position.

When the motor 31 has driven the range indicator 32 to the maximum position, it simultaneously drives the modulation control 14 to the position giving minimum frequency deviation $\Delta f_0$ for the transmitter. When the received signal is restored, as by turning on the apparatus, relay 49 is deenergized to reconnect the filter 29 to detector 28. At the first moment, $\Delta f_0$ will be very small, producing a small value of $\overline{B}$, much less than 1.84. This will produce a signal of frequency $f_a$ of the phase-sense required to reduce the range indication and increase $\overline{\Delta f_0}$, until $\overline{B}=1.84$, when motor 31 stops, as desired. In this way it is assured that the motor always locks in at the first peak value (1.84) of $\overline{B}$.

Through a mechanical connection 51 the motor 31 also drives the variable arm 33 of an automatic gain control potentiometer 34 connected between a suitable source of negative bias and ground. Arm 33 is connected in obvious manner to a suitable stage of the IF amplifier 27 to control the gain of the amplifier. It will be understood that the magnitude of the signal supplied to the IF amplifier 27 will vary widely over the intended range of the device which may for example be from 3 feet to 3000 feet during which the received signal may vary by as much as 60 db. To be sure that the motor 31 is always provided with sufficient signal for control purposes, conventional automatic gain control may be incorporated in the IF amplifier 27 and in addition the gain of the amplifier may be mechanically controlled in direct correspondence with the range by use of the gain control potentiometer 34 so as to increase the gain of the amplifier 27 for higher altitudes where the receiver signal will be smallest.

It will be understood that any other suitable way of adjusting motor 31 to the null value of the control signal $f_a$ may be utilized including conventional phase-sensitive and remote positioning circuits.

Accordingly, it will be seen that the present specific embodiment of the invention has provided a system by which a frequency-modulated signal is derived by mixing the return of a frequency-modulated signal from a distant body with a frequency-shifted version of the transmitted signal and has range information extracted from its first side band, and this information is utilized to maintain the system in a condition maximizing the first side band component. As indicated above, the motor 31 adjusts the output of modulator 13 so as to adjust the magnitude of the modulating signal applied to the FM transmitter 18. This in turn varies the frequency deviation $\Delta f_0$ of the FM output from transmitter 18. By radiating the FM wave, receiving a reflected return from a distant body, and mixing the return signal with a frequency-shifted version of the transmitted signal, an FM signal is obtained whose modulation index B is a function of both $\Delta f_0$ and the range of the body. The system operates to maintain the modulation index B at a value for which the first order Bessel function (which determines the amplitude of the first side band) is maximum, namely 1.84. By thus maximizing the first order Bessel function, the system maintains the mixer output signal $S_M$ at a maximum value for the first order side band. In so doing, in accordance with the derivation given above, the adjustment of the modulation index B is directly representative of the range. It will be understood that the control frequency oscillator producing $f_a$ has as its primary function the provision of means for enabling automatic maximizing of the first order side band of the mixer output signal.

Where desired, if the transmitter is formed by a reflex klystron, means may be provided for centering the klystron power output at the peak of its power characteristic by sampling the power output of the klystron (which is modulated at $f_1$) and comparing the phase of that modulation with the original modulating signal of frequency $f_1$. The phase relationship of these two signals may be used to derive a correction voltage which is applied to the repeller electrode to keep the klystron at the peak of its power mode. A similar arrangement is described in the above-mentioned application Serial No. 614,491 and below.

The analysis given above shows that each of the sideband components of the mixer output $S_M$ contains range information in the form of its amplitude modulation at frequency $f_a$, so that higher order sidebands than the first could be used for the purpose of locking-in motor 31. While the use of the first order sideband component having its amplitude defined by the first order Bessel function $J_1(B)$ is suitable for the present system as described above, the use of the second order Bessel function $J_2(B)$ has certain additional advantages. This second order spectral component has a first maximum occurring at $B=3.05$ and other maxima of lower amplitude for higher values of B, which are not utilized. By causing the system to automatically adjust the average frequency deviation $\overline{\Delta f}$ at the transmitter to the value which produces the maximum value 3.05 of the function $J_2(B)$, increased rejection of undesirable signals and a further reduction in antenna feedthrough is attained. For example, if an unwanted signal from a short distance is received in the system described above with respect to FIGURE 5, such a signal would normally be stronger than the desired signal, and the system may tend to lock on to the stronger signal from the lesser range. However, by using the second order spectral component the tendency to stay locked to the correct range signal is increased. This advantage, in many situations, dictates use of the second order spectral component in place of the first order spectral component, even though the first order spectral component contains a greater proportion of the received energy, essentially by the ratio of .58 to .49 or about 1.6 db.

Figure 8:
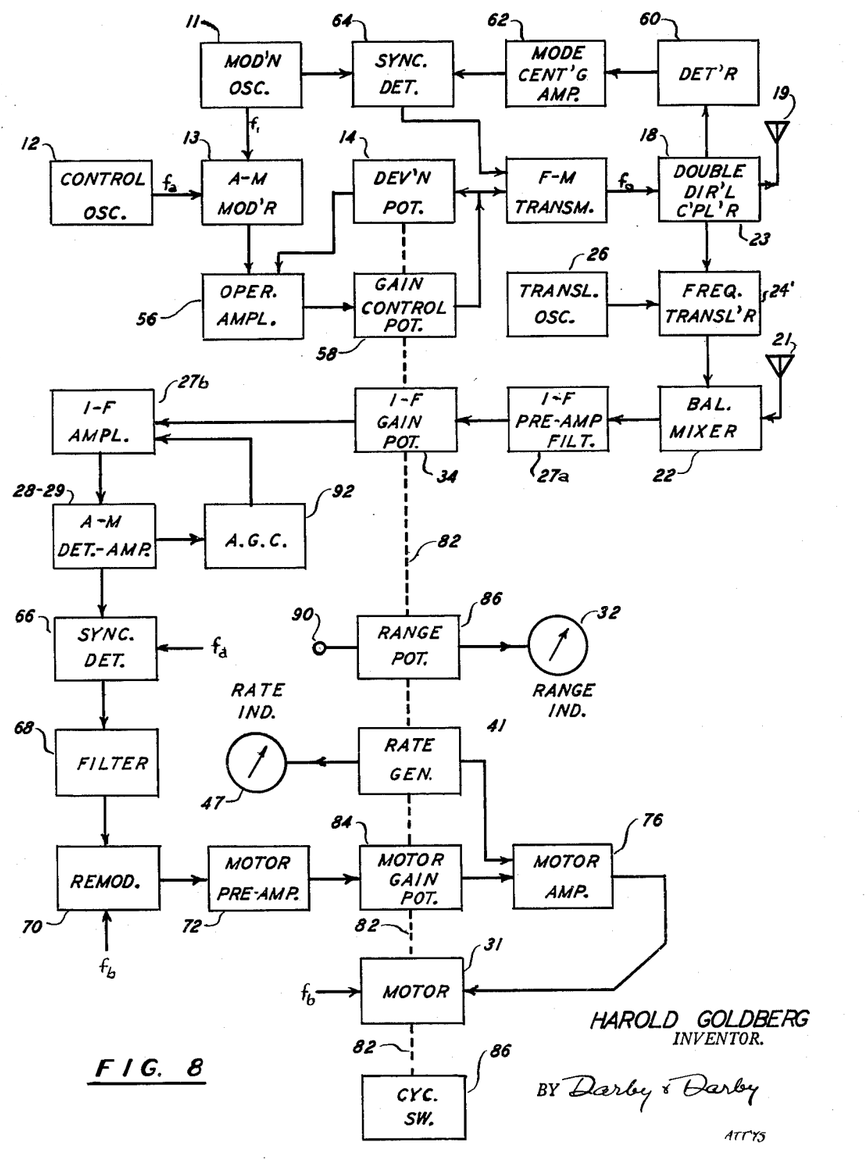
FIG. 8 is a block diagram of another form of the invention, utilizing the second order Bessel function characteristic.

FIGURE 8 shows a block diagram of a system similar in many respects to that described above, but particularly arranged to operate in accordance with the second order spectral component, and with additional features described below. Referring to FIGURE 8, the modulation oscillator 11 (which may also be called a deviation oscillator) produces an output of frequency $f_1$ as in FIG. 5. Oscillator 12 provides an output of frequency $f_a$, which is supplied to amplitude-modulation modulator 13 together with the output of frequency $f_1$ from oscillator 11. Modulator 13 then provides an amplitude-modulated output signal having carrier frequency $f_1$ and modulating frequency $f_a$. This output is supplied through an operational amplifier 56 and a gain control potentiometer 58 to the input of the frequency-modulation transmitter 18, to frequency modulate its output by the AM signal from modulator 13. The output of gain control potentiometer 58 is also supplied through a deviation control potentiometer 14 to the input of operational amplifier 56.

The frequency-modulated output of transmitter 18 is supplied through a conventional double directional coupler 23 to the transmitting antenna 19. The directional coupler 23 picks off two samples of the signal being transmitted and supplies one to the frequency translator 24' which is also supplied with the output or translator oscillator 26 having frequency $f_s$. The frequency translator 24' may be of any of the types discussed above with respect to phase shifter 24 of FIGURE 5 and serves to frequency-shift or translate the picked-off sample of the transmitted signal by the amount of the translation frequency $f_s$. This frequency-translated signal is then supplied to the balanced mixer 21 where it is mixed with the received signal received by the receiving antenna 19 after reflection from the distant point, such as a target, obstacle, terrain, or the like.

As indicated above, the FM transmitter 18 is preferably a reflex klystron, and the system may include, and FIGURE 8 shows, a closed loop for centering the operation of the klystron at the peak of its operating power mode. For this purpose, the second output of the directional coupler is supplied to a detector 60, which may for example be a crystal diode, and serves to detect the amplitude-modulation appearing on the signal picked off from the transmitted wave. This detected signal is passed through a mode-centering amplifier 62 to a synchronous detector 64, which is also supplied with the output of modulation oscillator 11 of frequency $f_1$.

The klystron mode-centering loop operates in a manner analogous to that described with respect to FIGURE 4. The klystron power characteristic of output power versus average repeller voltage is shaped similarly to the curve of FIGURE 4. If the klystron is operating with too low a repeller voltage, the output of detector 60 will have the fundamental frequency $f_1$. If it is operating at too high a repeller voltage, the detector output will have the same frequency, but with a 180° phase shift or, stated in other words, is of opposite phase-sense. When the klystron is operating at the peak of its power mode, the detector output will have a fundamental frequency that is twice $f_1$. Accordingly, the synchronous detector 64 will produce a D.C. output which is zero when the klystron is operating at the peak of its power mode, which has one polarity when the repeller voltage is too low and the opposite polarity when the repeller voltage is too high, and of a magnitude corresponding to the amount of departure from the peak. The output of the synchronous detector 64 is then added algebraically to the repeller voltage to re-center the klystron at the peak of its power mode automatically. The synchronous detector 64 compares the phases of its two input signals and adjusts the klystron repeller voltage. If the sample of the rectified transmitter output contains no $f_1$ signal, the repeller voltage is not changed. If the sample contains $f_1$ signal, indicating that the klystron is not operating at the peak of its power mode, the detector 64 adjusts the repeller voltage until the $f_1$ output of the mode-centering detector 60 is minimized. The repeller correction is positive or negative depending on whether the detector $f_1$ signal is in phase or out of phase with the deviation voltage impressed on the kylstron.

As indicated above, the output of the balanced mixer 22 is a band of frequencies centered at the translation frequency $f_s$ and with components separated therefrom by multiples of the modulation frequency $f_1$. In the present system the output of the balanced mixer is applied to an IF preamplifier and filter 27a, and IF gain potentiometer 34, and an IF amplifier 27b, all of which are designed to utilize the second order spectral component differing from the translation frequency $f_s$ by twice the modulation frequency $f_1$. In one example, the translation frequency may be 260 kilocycles and the modulation frequency 25 kilocycles, and the IF preamplifier, filter and amplifier are then tuned to the frequency 210 kilocycles and thereby serve to filter the desired second order spectral component from the balanced mixer output and to amplify it.

This selected component is then supplied to an amplitude-modulation detector and amplifier 28–29, which detects this selected spectral component to produce an output superposed unidirectional voltage with a variation superposed upon it at the control frequency $f_a$. This control signal is amplified and then compared in a synchronous detector 66 with a signal of the original control frequency $f_a$ which may be derived from oscillator 12. The operation here is exactly that disclosed with respect to FIGURE 4, except that the characteristic curve is that of $J_2(B)$ instead of $J_1(B)$. The synchronous detector output is a D.C. error signal whose magnitude and polarity depend upon the amplitude and relative phase-sense of the signals compared. As will be clear from the description below, the error signal essentially represents the difference between the actual range and the angular position of the motor 31 shaft. This D.C. output is passed through a filter 68 (which may be a simple RC network) to remove any residual noise and A.C. components and is then converted in the remodulator 70 into a signal of frequency $f_b$, whose amplitude and phase sense correspond to the amplitude and polarity of the D.C. error signal. Frequency $f_b$ may be the same as control frequency $f_a$ where desired and, in the case of airborne equipment, may be derived from the conventional 400 cycle power supply of the aircraft. The synchronous detector 66, filter 68 and remodulator 70 are utilized essentially as a narrow-band filter centered at the synchronous detector reference frequency $f_a$.

The D.C. error signal derived from the synchronous detector 66 is used to drive the motor 31 through a servo-motor circuit or loop. It will be understood that any suitable kind of servo-motor circuit may be utilized, of which the one described herein is illustrative. In particular, if desired, the D.C. error signal may be used directly without conversion to frequency $f_b$.

The error signal of frequency $f_b$ is amplified by a motor preamplifier 72 and adjusted in amplitude by a motor gain potentiometer 74, after which it is supplied to a motor amplifier 76 whose output actuates the motor 31 which is supplied by a reference signal of frequency $f_b$ in phase quadrature, so that the motor 31 will rotate in a direction and at a speed corresponding to the phase-sense and amplitude of the signal supplied to motor amplifier 76.

By the mechanical connection between motor 31 and shaft 82, turning of the motor shaft serves to modify the position of deviation control potentiometer 14, and thereby changes the frequency deviation of the FM signal transmitted from antenna 19, which in turn varies the amplitude of the spectral component selected in preamplifier filter 27a, and correspondingly modifies the signal which drives motor 31. The net result is that the motor 31 is driven toward the position at which the D.C. error signal output from detector-amplifier 28–29 is zero, corresponding to the peak of the second order Bessel function at a value $B=3.05$.

The motor 31 also drives a rate generator 41 coupled to its shaft, and the output of the rate generator is supplied to the input of motor amplifier 76 to provide the conventional rate feedback for damping and antihunting purposes. The output of rate generator 41 may also be supplied to an indicator 47 which will thereby show rate of change of range.

Also coupled to the motor shaft connection 82 are the motor gain potentiometer 84, a re-cycling switch 86 described below, a range potentiometer 88, the IF gain potentiometer 34, the operational amplifier gain control potentiometer 58, and the deviation control potentiometer 14.

Range potentiometer 88 is a linear potentiometer supplied with fixed potential at 90, and in turn excites an indicator 92 which may be an ordinary meter. Indicator 90 gives a reading proportional to the displacement of shaft 82, and may be calibrated directly in terms of range.

The D.C. output of AM detector-amplifier 28–29 is also used to generate an AGC signal in a gain control circuit 92 of any desired type, and controls the gain of IF amplifier 27b in a conventional manner to tend to maintain the amplitude of the input to detector-amplifier 28–29 substantially uniform. Since the amplitude of the IF signal will vary with range, and may thereby have a wide variation of the order of 1000 to 1, the IF gain potentiometer 34 driven by motor 31 also serves to adjust the amplitude of the IF signal to compensate for changes in signal level caused by change in range, to thereby assist in maintaining the input to detector amplifier 28–29 at a uniform value. This allows full gain at maximum range, and reduces the gain as minimum range is approached. Such reduced gain also serves to minimize the effect of antenna feedthrough, which is greater at low ranges due to the greater frequency-modulation deviation required to maintain the measurement loop in balance.

Since the error voltage supplied to remodulator 70 essentially represents the difference between the motor shaft position and the actual range (i.e., the difference between indicated and actual ranges) if the motor circuit were directly controlled by the error voltage, the response of the motor would be much more rapid at small ranges than at large ranges, because a given error in feet is a much larger percentage of a small range than of a large range. The motor preamplifier gain potentiometer 84 corrects this situation by making the motor amplifier input a function of range, and therefore maintains the dynamic behavior of the motor shaft constant at all ranges by causing the error signal supplied to the preamplifier to be a function of the percentage error in range rather than the actual difference error.

The system of FIG. 8 operates in a manner similar to that of FIG. 5, but utilizing the $J_2(B)$ characteristic. Thus, the frequency deviation $\Delta f$ of the transmitter output is modulated at the frequency $f_a$ (by varying at the frequency $f_a$ the amplitude of the modulating signal of frequency $f_1$). The reflected signal is mixed with a frequency-translated version of the transmitted signal to produce the intermediate frequency signal having a center spectral component at the translation frequency $f_s$. In the arrangement of FIG. 8, only the spectral component at frequency $f_s-2f_1$, is selected and utilized. This component is actually an amplitude-modulated signal, of modulating frequency $f_a$. The magnitude of the component varies as the Bessel function $J_2(B)$.

As indicated above, to a first approximation B is proportional to the product of the transmitter frequency deviation $\Delta f_0$ and the range R. In the system of FIG. 5, B is kept at a peak value of the characteristic $J_1(B)$ by adjusting $\Delta f_0$, whose adjustment then becomes an indication of range R. For ranges from 3 to 3000 feet, in an illustrative system, this can produce accuracies of 5% or better. For greater accuracy, in FIG. 8, the more exact relationship $B=k_1\Delta f_0 \sin k_2R$ (where $k_1$ and $k_2$ are constants) is used. In this relationship, for $B=$constant (as when $J_2(B)$ is kept at a peak of the curve $\Delta f_0$ is proportional to $1/\sin k_2R$. Hence, to keep B at the peak, $\Delta f_0$ is adjusted inversely to $\sin k_2R$. For this purpose, the deviation control potentiometer 14 is contoured as a sine function; that is, its output voltage is a sine function of the shaft rotation. This can be done in conventional manner by a suitably tapered winding, or by suitably dimensioned resistors connected across taps along the winding. Being in the feedback path of operational amplifier 56, the deviation control potentiometer 14 causes the output of amplifier 56 to vary inversely to the gain of potentiometer 14; that is, inversely to the sine function of range R, as desired. Hence the modulating signal to transmitter 18 is varied inversely to sin $k_2R$, which thus adjusts $\Delta f$ in the manner required.

The gain control potentiometer 58 is also in the feedback path for operational amplifier 56. Its purpose and function is to permit sufficiently wide range of amplifier gain to allow the system to operate over maximum to minimum range values of the order of 1000 to 1, without deterioration of accuracy beyond practical limits. At small ranges, such as less than 100 feet, sufficient accuracy is maintained by a fixed tolerable error (such as 2 feet) regardless of percentage error. However, for larger ranges, an accuracy within a percentage limit (such as 2 to 5%) is desirable. By having potentiometer 58 linear for ranges over a fixed limit, such as 100 feet, and tapered for smaller ranges, the normal gain range for amplifier 56 can be extended to the required overall variation of the order of 1000 to 1, without jeopardizing desired practical accuracy limits. Thus, assuming deviation control 14 to be stationary, gain control 58 can be designed to give uniform amplifier gain down to 100 feet, and then sharply and uniformly reduce the gain by a factor of 2500 to 5 for smaller range values.

The resulting IF amplifier output from this action is amplitude-detected to recover the modulation component of frequency $f_a$ as an error signal. For ranges smaller than that corresponding to $B=3.05$, an error signal of frequency $f_a$ is developed of the same phase as the original $f_a$ modulation component while for ranges greater than that yielding $B=3.05$, the error signal has opposite phase. At the range corresponding to $B=3.05$, the $f_a$ error signal has a null. The phase-sensitive nulling servo mechanism operating at either frequency $f_a$ or $f_b$ controls the frequency deviation $\Delta f_0$ and closes the servo loop to produce a shaft position corresponding to range. This shaft position is read out on the arm of coupled potentiometer 88 as a signal whose amplitude is directly proportional to range.

As in the case of the system of FIGURE 5, the system of FIGURE 8 is caused to lock-in on the peak of the selected Bessel function characteristic by amplitude-modulation of the transmitter frequency-modulating signal. The AM index is chosen to have a value from 30% to 70%, so that (in FIG. 8) when the modulation index B is greater than 3.05, the swing of the modulation index due to this amplitude-modulation will be either along the downward slope of the first lobe of the $J_2$ characteristic curve, or will cover a multiplicity of lobes, resulting in a fundamental frequency component of the input to synchronous detector 66 which is of fixed phase-sense regardless of how far above the peak the system may start out at. Similarly, below the 3.05 peak, the B variation produces a fundamental frequency component of opposite phase-sense, so that the system can null itself and lock-in upon the $J_2$ peak.

Figure 9:
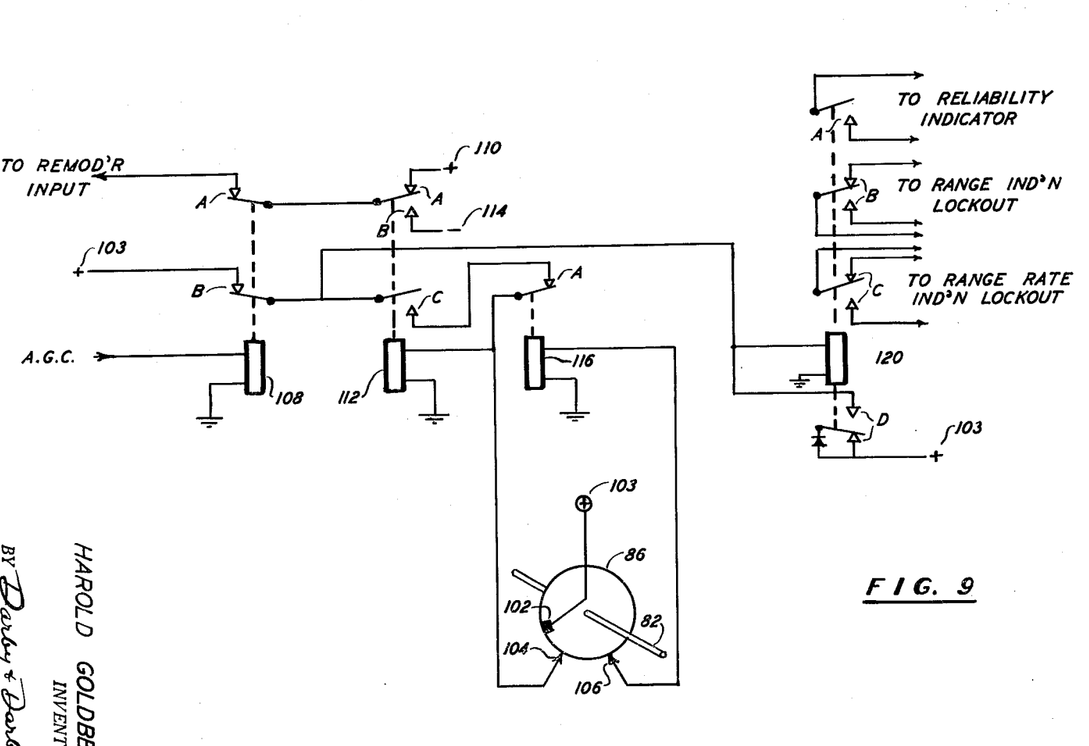
FIG. 9 is a schematic circuit diagram of a portion of the system of FIG. 8, operative during signal failure or unreliable signal periods.

In order to assure lock-in or acquisition when the system is first energized or armed, or after a signal is lost for any reason, a search arrangement is provided. As illustrated in FIG. 9, the deviation control is programmed to cycle between positions corresponding to maximum and minimum range, to assure that it will pass through the proper altitude positions for the system to lock in. This acquisition arrangement is operated by cycling switch 86 rotated by motor shaft 82. Switch 86 has a movable contact 102 connected to a source 103 of electrical energy, such as a battery, alternator or power mains. Contact 102 cooperates with and makes electrical connection to either a fixed contact 104 at the shaft position of maximum range, or a fixed contact 106 at the shaft position of minimum range.

The cycling arrangement is initialy controlled by a reliability relay 108 whose winding is supplied with a potential derived from AGC circuit 92. So long as there is sufficient signal input to detector 28 to assure reliable system operation, there will be AGC voltage which keeps reliability relay 108 energized, and the cycling arrangement is disabled. However, once the signal falls to an unreliable level, relay 108 de-energizes, and closes a circuit through its contacts A, from either a positive fixed electrical source 110 thru contact A of relay 112, or a negative fixed electrical source 114 through contact B of relay 112, to the remodulator 70 of FIG. 8. Assuming this connection is thru relay contact 110A as shown in FIG. 9, this positive potential drives motor 31 in the direction of increasing range, until cycle switch contact 102 connects to maximum contact 104. This energizes relay 112 from source 103, and by contact B reverses the polarity impressed upon remodulator 70, to reverse the motor rotation toward the minimum range position. At the same time, contact 112C closes a holding circuit for relay 112 from source 103 through now closed contact A of relay 116. The motor 31 now runs until cycle switch contact 102 connects to minimum contact 106. This energizes relay 116 from source 103, to open its contact A to de-energize relay 112 (contact 104 now being open), and restores the circuit of relay 112 and its contacts to the condition shown in FIG. 9. This again reverses motor 31 to run toward maximum range, and the arrangement repeats the cycle, so long as reliability relay 108 remains deenergized.

Should a reliable signal be received during this cycling, relay contact 108A opens to disconnect the cycling circuit from the remodulator, and to prevent re-cycling of the motor. The motor 31 then remains under the influence of the received signal to lock-in on the $J_2(B)$ peak, as already described, and the system resumes its normal mode of operation.

In addition to cycling, it is desirable to disable the range and range rate indicators while searching. This can be done by relay 120, energized by contact B of reliability relay 108 upon loss of reliable signal. Its contacts B may be used in known manner to lock out or disable the range indication, while similar contacts C can do the same for the range rate indication. Also, contact A may be used to energize a reliability indicator to show that the system is not performing range measurement.

In some cases, as when using the range measurement for computing, it may be desirable to keep the indicators disabled once the system has gone unreliable. This can be done by contact D of relay 120, which holds relay 120 energized even after reliability relay 108 becomes energized.

It will be understood that the servo mechanism shown in FIGURE 8 can be utilized in place of the phase splitter and push-pull amplifier of FIGURE 5, and that other desired servo mechanisms responsive to the developed error signals may also be used where desired.

While in the above systems, the frequency modulation of the transmitter has been described as sinusoidal at frequency $f_1$ (amplitude modulated at $f_a$), this is not essential since other types of modulating signal may be used. In particular, square-wave modulation at $f_1$ offers certain advantages.

Also, the analysis given above indicates that each of the side band spectral components of $S_M$ contains range information, so that higher order side bands than the first or second could be used to lock in motor 31, by merely tuning IF amplifier 27 or 27a thereto. However, particularly because in the first order function $J_1$ there is a greater variation between the amplitudes of the first few maxima, and because in the second order function $J_2$ there is improved reliability and less antenna feedthrough, these sidebands are preferred.

In addition, operation is possible, but in a somewhat degraded fashion, if phase shifter 24 is replaced by a balanced modulator, or is omitted entirely. Other forms of frequency shifters or translators may also be used. In such case, the Doppler frequency $f_D$ should be small or great compared to $f_a$.

The present invention has therefore provided a greatly improved system for distance and velocity determination useful as an altimeter, a terrain clearance indicator, an obstacle detector, for radar ranging or the like, in which simple conventional-type apparatus provides highly useful and accurate results without ambiguity and solves the problem of feedthrough, and is not subject to errors because of cycle counting, time measuring or step errors. It will be clear that the distance being indicated could be range to a target or an obstacle or the altitude above ground or other terrain.

In one representative system, the invention has been used in a low-altitude altimeter system, with a range from 3 feet to 3000 feet and useful for landing approach. Accuracy of measurement of ±2 feet +2½% over the range of 30 to 1,800 feet and ±2 feet +5% over the ranges of 3 to 30 feet and 1,800 to 3,000 were attained.

In this representative system the following additional specifications existed:

Frequency—4250 to 4350 megacycles per second.
Range—30 to 3,000 feet.
Altitude resolution—1% or 1 foot, whichever was greater.
Altitude rate signal accuracy—5%.
Altitude and altitude rate signal linearity—5%.
Altitude rate range—up to 200 feet per second.

Since many apparently widely differing systems can readily be devised within the principles set forth above, it is to be understood that the foregoing description is intended to be illustrative only and is not to be taken in a limiting sense, the scope of the invention being defined solely by the appended claims.

What is claimed is:

1. Radio distance-measuring apparatus comprising means for producing a first signal of a predetermined frequency, means for amplitude-modulating said signal at a control frequency to form a modulating signal, a carrier wave source, means for frequency-modulating said carrier wave by said modulating signal to form a frequency-modulated carrier wave, means for radiating said frequency-modulated carrier wave, means for receiving said frequency-modulated carrier wave after reflection from a spaced point, means for deriving a local wave from said modulated carrier wave, means for mixing said local wave with said received wave to produce a difference-frequency signal, means for frequency-shifting one wave of the group consisting of said received, radiated, and local waves prior to said mixing, means responsive to said difference-frequency wave for maintaining a constant average value of modulation index for said difference-frequency signal despite variations in range of said body, and means for detecting a sample of said modulated carrier, and means responsive to said detected sample for adjusting the power level of said modulated carrier.

2. In a continuous-wave frequency modulation radio distance measuring system having means for radiating a frequency-modulated carrier wave, means for receiving said frequency-modulated carrier wave after reflection from a spaced point, and means for producing from said received wave a signal having the waveform of a frequency-modulated wave with a modulation index which is a function both of range to said point and of the frequency deviation of said radiated carrier wave, the improvement comprising means for adjusting a characteristic of said radiated wave to maintain a predetermined characteristic of said produced signal at a fixed condition, range-indicating means responsive to said adjusting means and means responsive to cessation of said produced signal for cyclically actuating said range-indicating means between a maximum value and a minimum value.

3. In a continuous-wave frequency-modulation radio distance-measuring system having means for radiating a frequency-modulated carrier wave, means for receiving said frequency-modulated carrier wave after reflection from a spaced point, means for producing from said received wave a signal having the waveform of a frequency-modulated wave with a modulation index which is a function both of range to said body and of the frequency deviation of said radiated carrier wave, the improvement comprising means for adjusting the frequency deviation of said radiated wave to maintain a predetermined sideband of said produced signal at a maximum amplitude, a distance indicator responsive to said adjusting means and means responsive to cessation of said produced signal for cyclically varying said deviation between two fixed values.

4. In a continuous-wave frequency-modulation radio distance-measuring system having means for radiating a frequency-modulated carrier wave, means for receiving said frequency-modulated carrier wave after reflection from a spaced point and means for producing from said received wave a signal having the waveform of a frequency-modulated wave with a modulation index which is a function both of range to said body and of the frequency deviation of said radiated carrier wave, the improvement comprising means for periodically varying the frequency deviation of said radiated carrier at a predetermined control frequency, means for deriving from said produced signal a control signal of said control frequency, means responsive to said control signal for maintaining a predetermined characteristic of said first signal in a fixed condition, a range-indicator responsive to said last means, and means responsive to cessation of said produced signal for alternately substituting two fixed signals for said derived signal.

5. In a continuous-wave frequency-modulation radio measuring system having means for radiating a frequency-modulated carrier wave having a frequency deviation, means for receiving said frequency-modulated carrier wave after reflection from a spaced point, means for producing from said received wave a signal having the waveform of a frequency-modulated wave of fixed carrier frequency and with a modulation index which is a function both of range to said point and of the frequency deviation of said radiated carrier wave, means for adjusting said frequency deviation to maintain said modulation index substantially constant, and indicating means responsive to said adjusting means, the improvement comprising means for modifying said adjusting means in accordance with a sine function of range.

References Cited by the Examiner

UNITED STATES PATENTS

| | | | |
|---|---|---|---|
| 2,726,383 | 12/55 | Dunn | 343—14 |
| 3,054,104 | 9/62 | Wright et al. | 343—14 |

MAYNARD R. WILBUR, Primary Examiner.

FREDERICK M. STRADER, CHESTER L. JUSTUS, Examiners.